Jan. 26, 1943.   F. G. HENRY   2,309,246
MOTOR CONTROL MECHANISM FOR FILLING DEVICES
Filed July 9, 1940   3 Sheets-Sheet 1
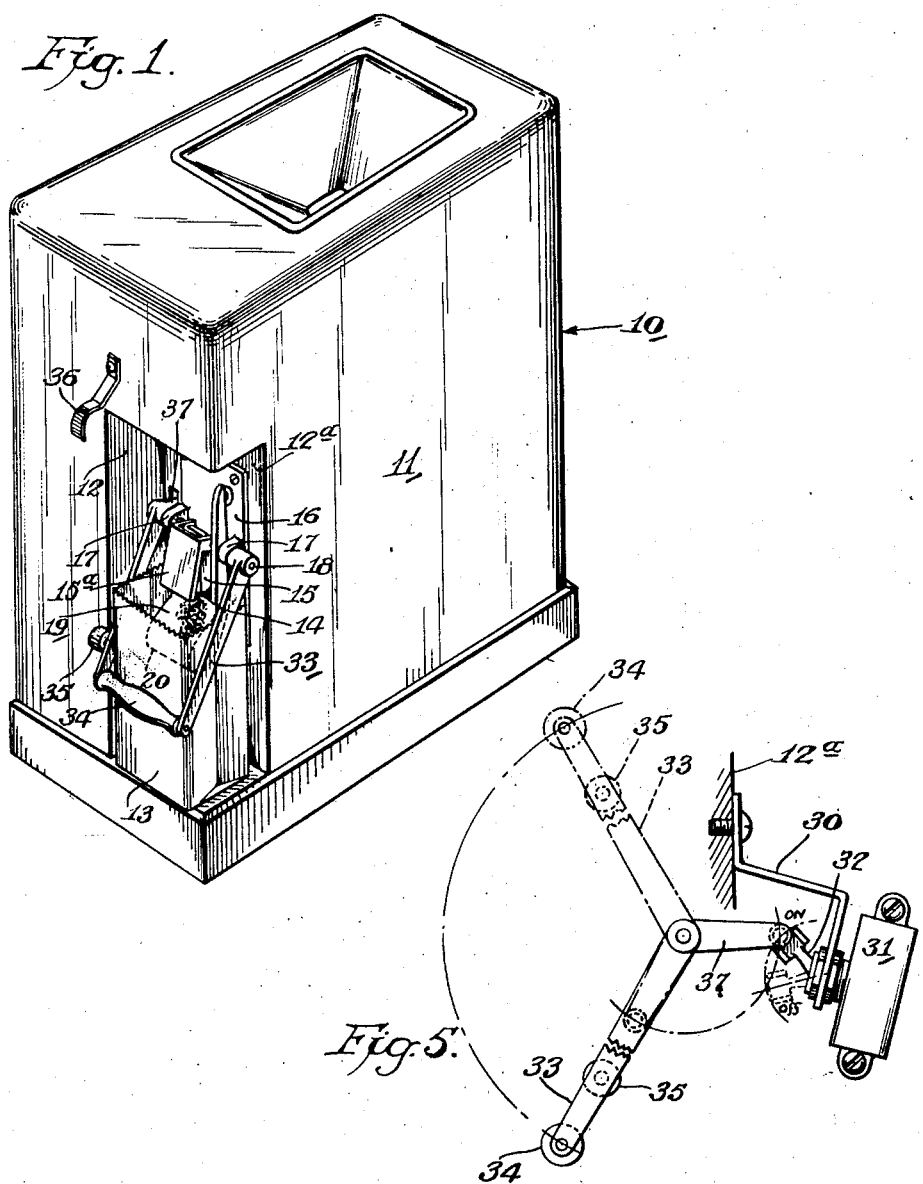
Inventor:—
Ferdinand G. Henry
by his Attorneys
Howson & Howson Jan. 26, 1943. F. G. HENRY 2,309,246
MOTOR CONTROL MECHANISM FOR FILLING DEVICES
Filed July 9, 1940 3 Sheets-Sheet 2
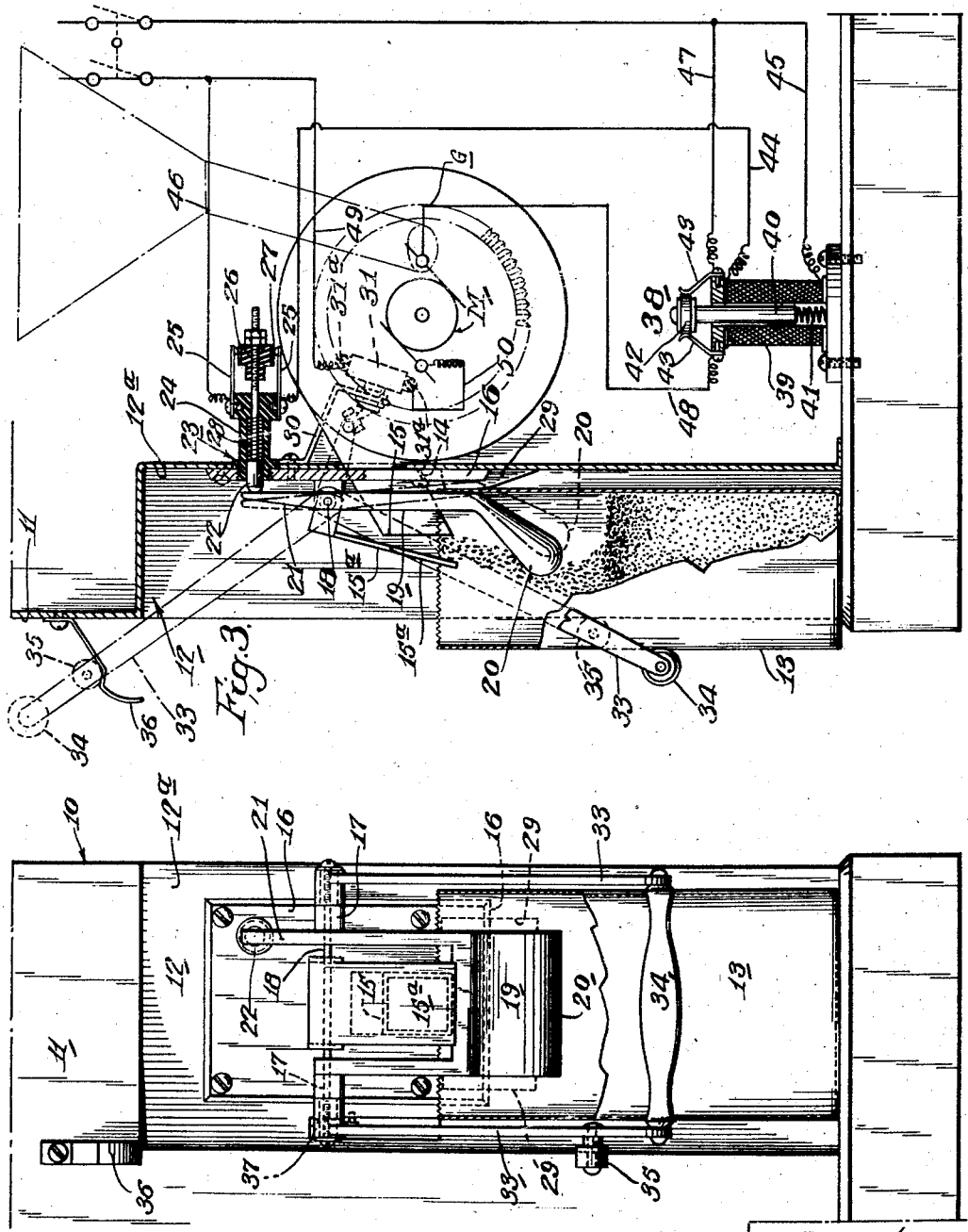
Inventor:—
Ferdinand G. Henry
by his Attorneys
Howson & Howson

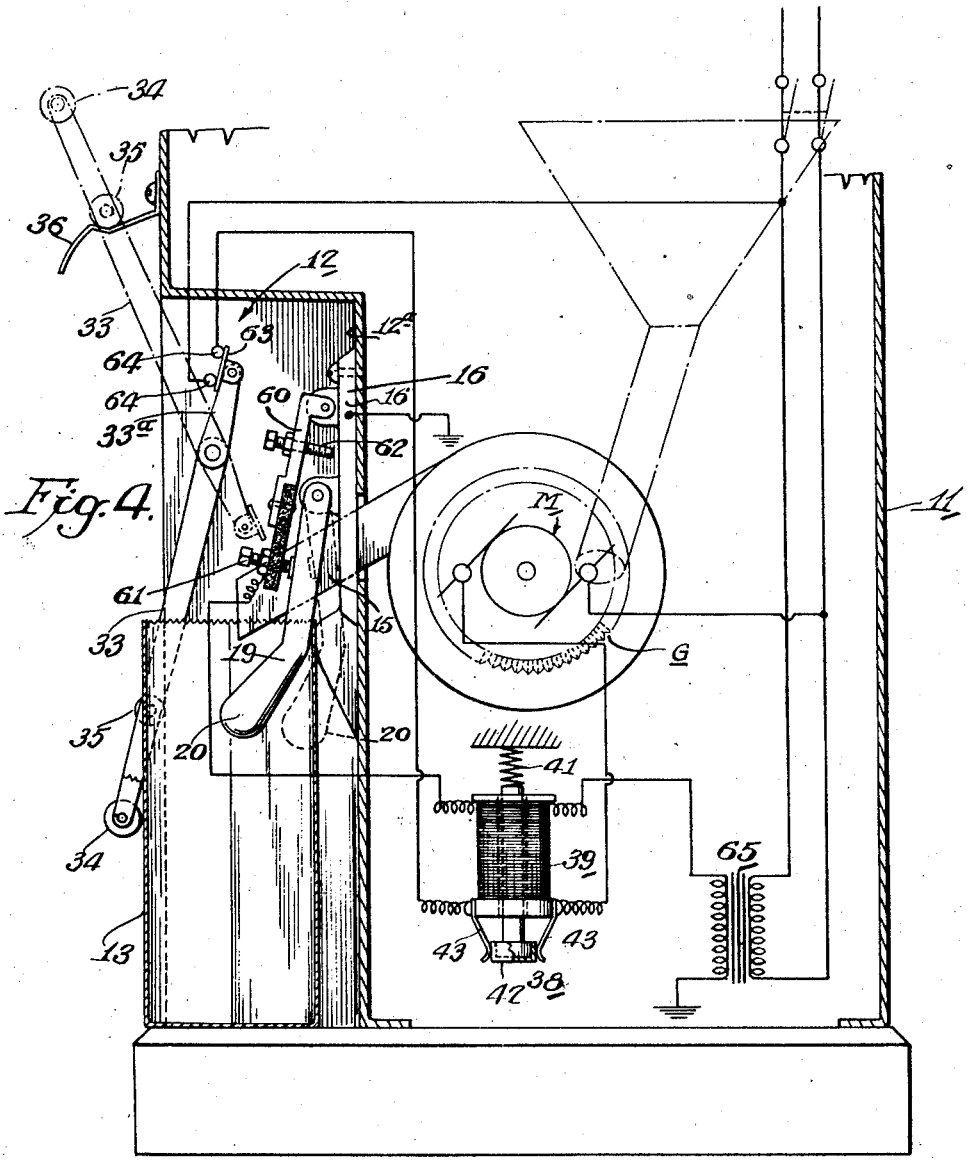

Patented Jan. 26, 1943

2,309,246

UNITED STATES PATENT OFFICE 2,309,246

MOTOR CONTROL MECHANISM FOR FILLING DEVICES

Ferdinand G. Henry, Philadelphia, Pa., assignor to The Enterprise Manufacturing Company of Pennsylvania, Philadelphia, Pa., a corporation of Pennsylvania Application July 9, 1940, Serial No. 344,596

9 Claims. (Cl. 226—93)

This invention relates to devices for automatically starting and stopping electric motors, and more particularly electric motors for driving one or more of the grinding elements of a coffee mill.

In coffee mills of the type now generally used in self-service and other markets the proper procedure is to first fill the hopper of the mill with the coffee to be ground, then place a bag in the receiving position under the discharge opening and start the motor in operation. After the coffee is ground, the motor is shut off and the filled container is removed from the mill.

It often happens, however, that the operator will fill the hopper with coffee, start the motor and neglect to place a bag or container to receive the same, thereby causing a flow of coffee over the premises. This condition is objectionable, wasteful and unsatisfactory. It also may happen that the operator may remove the container before stopping the motor and, before the entire amount of coffee is ground and delivered, resulting again in objectionable discharge of coffee on the premises. Another objection is the fact that after all proper procedure has been complied with the operator may remove the container and neglect to stop the motor, causing waste of electricity and unnecessary wear on the moving elements of the mill.

With the foregoing observations in mind the principal object of the present invention is to provide a coffee mill of the type described comprising means operable to start the motor only after the receiving bag or container has been properly placed in its receiving position beneath the discharge spout of the coffee mill.

Another object of the invention is to provide a coffee mill as described having means operable to prevent the removal of a filled or partially filled bag before stopping the motor.

Another important object of the invention is the provision of means operative to start the motor upon placing the bag in its receiving position under the discharge spout and also automatically to stop the motor when the bag or container is removed therefrom upon completion of the grinding operation.

These and other objects of the invention and the various details and features of its construction and operation are hereinafter fully described and shown in the accompanying drawings, in which:

Figure 1 is a view in perspective of a coffee mill of the type described showing its receiving spout provided with certain elements of the present invention.

Figure 2 is an enlarged fragmentary front elevation of a portion of the mill illustrating the control members in their operative positions.

Figure 3 is a side view partially in section showing the operative and inoperative position of the control members shown in Figure 2.

Figure 4 is a view similar to Figure 3 illustrating a modified construction of the control members within the scope of the present invention; and Figure 5 is a fragmentary view in side elevation illustrating the operation of one of the control members shown in Figures 1, 2 and 3.

Referring now more particularly to the drawings, reference numeral 10 designates, generally, a coffee mill of conventional type comprising a casing structure 11 within which is contained the usual coffee grinding elements designated G and electric driving motor M therefor. A recess 12 is shown in the lower right hand front portion of the casing 11 for the reception of the usual coffee bag 13 and outwardly into this recess 12 through an opening 14 in said casing 11 declines a chute or spout 15 through which the ground coffee is discharged from the grinding elements G into said bag 13. Coffee is fed to these grinding elements G by a hopper H.

This discharge chute or spout 15 also extends through an opening formed in a breast plate 16 secured on the rear wall portion 12a of the recess 12 and this plate 16 is provided with forwardly facing bearings or lugs 17 located adjacent the opposite side edges of the plate 16 above the level of the aforesaid coffee discharge spout 15. These lugs 17 support a shaft or pin 18 on which is rotatably mounted a bifurcated member 19 having at its lower extremity an angularly and outwardly offset weighted portion 20 which functions normally to maintain the said member 19 in the position shown in dotted lines in Figure 3 with the lower portion of said member engaging against the breast plate 16. Also carried by this pin 18 is a cover or closure 15a for the aforesaid discharge chute 15.

One of the bifurcations of said member 19 extends upwardly above the pin 18 and constitutes an arm 21 arranged for operative engagement with the outer end of the plunger 22 of a pilot switch 23. This pilot switch 23 is secured through the rear wall portion 12a of the recess 12 to the previously mentioned breast plate 16, and comprises an insulated body portion 24 to opposite sides of which are secured resilient electric connectors 25.

Adjustably carried by the aforesaid plunger 22 is a collar 26 of dielectric material which has on its outer surface an electric contact ring 27 arranged for simultaneous engagement with the said electric connectors 25 to complete an electric circuit therethrough. The plunger 22 is biased in a direction outwardly of the casing 11 by means of a spring 28 so that its outer end remains in engagement with arm 21 of the member 19 when the latter is in the dotted line position shown in Figure 3, and the collar 26 and its ring 27 are secured longitudinally of said plunger 22 so that when the latter is in this outward position the said ring 27 is disengaged from contact with the electrical connectors 25 so that the electric circuit between the latter is open.

Projecting forwardly into the recess 12 laterally adjacent the bifurcated member 19 are vertically elongated projections or guides 29 against which the inwardly disposed face of the coffee bag 13 is positioned. Also, when the bag 13 is thus placed in position against these guides 29 the lower portion of the bifurcated member 19 is disposed interiorly of the said bag with the result that the bag in cooperation with the guides 29 functions to maintain or hold the lower part of the bifurcated member 19 outwardly in the position shown in solid lines in Figure 3 thereby moving the upper arm portion 21 thereof inwardly and causing inward actuation of the plunger 22 of switch 26 to engage the ring 27 with connectors 25 thus closing that switch.

Mounted within the mill casing 11 by means of a bracket 30 is a toggle switch 31 having the usual switch arm 32. Operation of this switch 31 through its arm 32 is effected by means of a U-shaped lever 33 which is pivotally mounted upon the aforesaid pin 18 and arranged to be moved manually between the two positions shown in Figure 3 of the drawings. This lever 33 has a transverse handle portion 34 and projecting laterally from the inner leg of said lever 33 is a roller 35 which, in the raised or inoperative position, is arranged to engage a spring clip member 36 whereby the lever is held in that position. Also, when the lever 33 is lowered to operative position this roller 35 engages the casing 11 and acts as a stop to prevent said lever 33 from being engaged and collapsing the bag 13.

Projecting inwardly of the casing 11 from the upper end of the inner leg of the lever 33 and movable with the latter is a crank arm 37 which extends into the path of the toggle switch arm 32 and is arranged so that when the lever 33 is lowered the said crank 37 will actuate the toggle switch arm 32 to "on" position and when raised will actuate the same to "off" position( see Figure 5).

Interiorly of the mill casing 11 is a solenoid switch 38 comprising the conventional coil 39 and plunger 40, the latter being biased upwardly by a spring 41 and carrying at its upper end a contact ring 42 for engagement between electrical contacts 43, 43 to complete an electric circuit through them, the arrangement being such that when the soleniod coil 39 is not energized the spring 41 functions to maintain the plunger 40 in raised position with its ring 42 out of engagement with contacts 43, 43 thereby maintaining the solenoid switch open.

The electrical circuit for controlling and supplying current to the driving motor M and the relation of the several switches thereto will be clear from Figure 3 of the drawings wherein it will be seen that the solenoid coil 39 is connected respectively by conductors 44 and 45 to one side of a source of electric power and to one of the contacts 25 of the switch 23 while the other of said contacts 25 is connected by a conductor 46 to the other side of said electric power source. Thus the switch 23 functions only to control energization of the solenoid coil 39.

The switches 31 and 38 on the other hand are directly in the motor circuit and the completion of that circuit is dependent upon the closing of both of said switches. To this end one of the contacts 43 of the solenoid switch 38 is connected by a conductor 47 to one side of the aforesaid source of the electricity and the other of said contacts 43 is connected by a conductor 48 to one of the terminals of the motor M. Likewise, one of the contacts 31a of the toggle switch 31 is connected by a conductor 49 to the other side of said source of electricity and the other toggle switch contact 31a is connected by a conductor 50 to the other terminal of the said motor M.

Thus it will be observed that in order to start the motor M of the mill it is necessary first to close the switch 23 thereby energizing solenoid coil 39 to close switch 38 and then close the toggle switch 31 to finally complete the electric circuit to the said motor M.

Prior to using the mill, the coffee bag 13 will be missing from the recess 12 and the bifurcated member 19 and lever 33 will be in the positions shown in dotted lines in Figure 3 of the drawings, thus the several switches 23, 31 and 38 will all be open and the motor M idle. Now when it is desired to grind coffee in the mill the coffee is placed in the usual hopper (not shown) and a coffee bag 13 is positioned in the recess 12 with the inner wall of said bag 13 interposed between the projections or guides 29 and the bifurcated member 19, thus causing the latter to assume the solid line position shown in Figure 3 thereby actuating the plunger 22 to close the switch 23, resulting in energization of the solenoid coil 39.

Energization of coil 39 actuates the plunger 40 downwardly against its spring 41 thereby closing switch 38 and partially completing the circuit to the motor M which, however, remains idle until finally the lever 33 is lowered to its operative position thereby actuating the toggle switch 31 to "on" position to complete the circuit to said motor M which will then start and continue operation until the toggle switch 31 is opened by raising the lever 33.

Thus it will be observed that the coffee bag 13 cannot readily be removed from the recess 12 while the motor is operating and that in order to remove the bag the motor must first be stopped by raising the lever 33 which is accompanied by opening of the toggle switch 31.

On the other hand, it will be seen that if no coffee bag is positioned in the recess 12 the motor cannot be started merely by lowering the frame 33 to close the toggle switch 31 since the presence of a bag is necessary in order to close the switch 23 and in turn close the solenoid switch 38 and thereby complete the circuit to the motor M. Consequently the mill cannot be operated unless a coffee bag is properly positioned to receive the coffee and once the mill is in operation such bag cannot be removed until the mill is stopped.

A modification of the invention is shown in Figure 4 of the drawings, and this is quite similar to the form previously described except that in place of switch 23 I provide a pivotal arm 60 in the recess 12 forwardly of the bifurcated member 19 and on this arm 60 there is mounted an adjustable contact 61 arranged for engagement by said bifurcated member 19 when the latter is moved to its operative position (solid lines) by the presence of a bag 13 as previously described. An adjustable stop screw 62 is provided on arm 60 and contacts breast plate 16 to limit movement of said arm 60, thus breaking contact between contact 61 and member 19 as the latter moves to inoperative (dotted line) position.

The toggle switch 31 likewise is dispensed with and a contact 63 carried by the extension 33a of the lever 33 is arranged to bridge a pair of contacts 64, 64.

The principal difference between the construction shown in Figures 3 and 4 is primarily in the electrical circuit for whereas, in Figure 3 the solenoid coil 39 is in series with switch 23 and connected across the electric power source at line voltage, in Figure 4 a transformer 65 is introduced in the circuit and has its primary directly across the power source at line voltage, while the secondary circuit has one side grounded and the other connected to the solenoid 39. Either circuit may be employed as desired, that illustrated in Figures 2 and 3 carrying line voltage throughout the system, whereas that shown in Figure 4 carries line voltage through the transformer primary and motor M only, and a reduced secondary voltage through the solenoid 39 and contact 61.

These structural modifications embodied in the device shown in Figure 4 do not, however, alter the operation and procedure for using the mill, and this modified form of the mill is operable and used just as hereinafter described in connection with the mill shown in Figures 1 to 3 of the drawings.

Furthermore, if it be desired to render operation of the mill entirely automatic and controlled wholly by the placing of a coffee bag in the casing recess 12, it is pointed out that this can be readily accomplished by eliminating the manually movable lever 33 and the particular switch operated thereby (or by allowing such switch to remain in the device and in circuit closing position at all times). If this is done it will be observed that the proper placing of a coffee bag 13 in the recess 12 will operate, as previously described, to operatively position the bifurcated member 19 thus closing the circuit to the solenoid coil 39 and thereby causing the solenoid switch 38 to close and start the motor M which will continue to run so long as the bag 13 remains in that position. Conversely, when the bag 13 is removed from the recess the motor M will be stopped automatically by movement of the now freed bifurcated member 19 to its inoperative position thus opening its switch causing deenergization of the solenoid coil and, in turn, opening of the solenoid switch in the motor circuit.

While certain embodiments of the invention have been herein illustrated and described, it is not intended that the said invention be limited to such disclosures but that changes and modifications may be incorporated and embodied therein within the scope of the annexed claims.

I claim:

1. In material handling apparatus comprising a driving motor and a circuit for supplying electricity thereto to operate the same; a casing for said apparatus having in its exterior surface a recess in which a container is adapted to be positioned, a discharge chute extending into said recess from the interior of the casing and arranged to discharge material into a container positioned in the recess, means in said casing and driven by the motor for feeding material to said discharge chute, a normally open switch in the motor circuit, and means for closing said switch including a member movable into an operative position across said recess and engaging a container therein to prevent removal of the container until said member is moved from said operative position to open said switch and thereby stop the motor.

2. In material handling apparatus comprising a driving motor and a circuit for supplying electricity thereto to operate the same; a casing for said apparatus having in its exterior surface a recess in which a container is adapted to be positioned, a discharge chute extending into the recess from the interior of the casing and arranged to discharge material into a container positioned in the recess, means in said casing and driven by the motor for feeding material to said discharge chute, a normally open switch in the motor circuit, energizable means operable to close said motor circuit switch, an energizing circuit for said energizable means, a switch in said energizing circuit, and a member mounted in the casing recess and operated automatically by the positioning of a container in said casing recess to receive the discharged material to close said switch in the energizing circuit and energize said energizable means to close the motor circuit switch.

3. In apparatus for treating material comprising a driving motor and a circuit for supplying electricity thereto to operate the same; a casing for said apparatus having in its exterior surface a recess in which a container to receive the treated material is adapted to be positioned, a discharge chute extending into said recess from the interior of the casing and arranged to discharge material into a container positioned in the recess, means in said casing and driven by the motor for feeding material to said discharge chute, a normally open switch in the motor circuit, energizable means operable to close said motor circuit switch, an energizing circuit for said energizable means, a switch in said energizing circuit, means in the casing recess operated automatically by the positioning of a container in said casing recess to receive the discharged material to close said switch in the energizing circuit and energize said energizable means, a second switch in the motor circuit, and means for closing said second motor circuit switch comprising a member manually movable into an operative position across the casing recess and in engagement with a container to prevent removal of the container so long as said member remains in said operative position.

4. In apparatus for treating material comprising a driving motor and a circuit for supplying electricity thereto to operate the same; a casing for said apparatus having in its exterior surface a recess in which a container for receiving treated material is adapted to be positioned, a discharge chute opening to the casing recess from the interior of the casing and arranged to discharge material into a container positioned in the recess, means in said casing and driven by the motor for feeding material to said discharge chute, a normally open switch in the driving motor circuit, energizable means operable to close said motor circuit switch, an energizing circuit for said energizable means, a switch in said energizing circuit, and a member in the casing recess operated automatically by the positioning and removal of a container within and from said casing recess to receive the discharged material to respectively close and open said switch in the energizing circuit and thereby operate said energizable means to close and open the motor circuit switch.

5. In apparatus for treating material comprising a driving motor and a circuit for supplying electricity thereto to operate the same; a casing for said apparatus having in its exterior surface a recess in which a container for receiving treated material is adapted to be positioned, a discharge chute extending into said recess from the interior of the casing and arranged to discharge material into a container positioned in the recess, means in said casing and driven by the motor for feeding material to said discharge chute, a normally open switch in the driving motor circuit, energizable means operable to close said motor circuit switch, an energizing circuit for said energizable means, a switch in said energizing circuit, means operated automatically by the positioning and removal of a container within and from said casing recess to receive the discharged material to respectively close and open said switch in the energizing circuit and thereby operate said energizable means to close and open the motor circuit switch, a second switch in said motor circuit, and a member manually movable to operative and inoperative positions to respectively close and open said second motor circuit switch, said member when in said operative position being disposed across the casing recess and in engagement with a container therein so as to prevent removal of the container without first moving the member to its inoperative position to open said second motor circuit switch and thereby stop the motor.

6. In material handling apparatus comprising a driving motor and a circuit for supplying electricity thereto to operate the same; a casing for said apparatus having in its exterior surface a recess in which a container for receiving material is adapted to be positioned, a discharge chute opening to said recess from the interior of the casing and arranged to discharge material into a container positioned in the recess, means in said casing and driven by the motor for feeding material to said discharge chute, energizable means for controlling the flow of current through the circuit to the motor, a switch for controlling said energizable means, guide means in the casing recess for properly locating the container therein, and means for operating the switch controlling the energizable means comprising a member mounted in said casing recess and actuable into operative position to close said switch by the act of positioning a container in the casing recess with a wall portion of said container interposed between said guide means and said member.

7. A device as claimed in claim 6 wherein the member for operating the switch controlling the energizable means is pivotally mounted and eccentrically weighted so as to move automatically from its operative position and open said switch upon the removal of the container from said recess.

8. In apparatus wherein material is adapted to be treated and then discharged comprising a driving motor and a circuit for supplying electricity thereto to operate the same; a casing for said apparatus having in its exterior surface a recess in which a container for receiving treated material is adapted to be positioned, a discharge chute opening to said recess from the interior of the casing and arranged to discharge material into a container positioned in the recess, means in said casing and driven by the motor for feeding material to said discharge chute, energizable means for controlling the flow of current through the circuit to the motor, a switch for controlling said energizable means, guide means in the casing recess for properly locating a container therein, means for operating the switch controlling the energizable means comprising a member in said recess actuable into operative position to close said switch by the act of positioning a container in the casing recess with a wall portion of said container interposed between said guide means and said member, a second switch in the motor circuit, and means for closing said second motor circuit switch comprising a member manually movable into an operative position across said casing recess and in engagement with a container therein to prevent removal of the container so long as said member remains in said operative position.

9. A device as claimed in claim 8 wherein the member for operating the switch controlling the energizable means is pivotally mounted and eccentrically weighted so as to move automatically from its operative position and open said switch upon the removal of the container from said recess.

FERDINAND G. HENRY.